(12) United States Patent
Deutsch et al.

(10) Patent No.: US 8,187,133 B2
(45) Date of Patent: May 29, 2012

(54) FATIGUE RESISTANT TRANSVERSE LUBRICATION PASSAGE FOR TRANSMISSION SHAFTS

(75) Inventors: Laurence Andrew Deutsch, Farmington Hills, MI (US); Steven Gerald Thomas, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 241 days.

(21) Appl. No.: 12/750,849

(22) Filed: Mar. 31, 2010

(65) Prior Publication Data

US 2011/0245008 A1 Oct. 6, 2011

(51) Int. Cl.
*F16H 57/04* (2010.01)

(52) U.S. Cl. ......................................................... 475/159

(58) Field of Classification Search .................. 475/159; 74/467; 123/196 R
See application file for complete search history.

(56) References Cited

U.S. PATENT DOCUMENTS

| | | | | |
|---|---|---|---|---|
| 4,719,818 A | * | 1/1988 | McCreary | 475/159 |
| 5,152,373 A | * | 10/1992 | Callies | 184/6.5 |
| 5,928,100 A | * | 7/1999 | Ohtake et al. | 475/159 |
| 6,474,444 B1 | | 11/2002 | Mochizuki | |
| 6,817,962 B2 | * | 11/2004 | Tanikawa | 475/159 |
| 2004/0103872 A1 | * | 6/2004 | Ronneburger et al. | 123/196 R |
| 2008/0251324 A1 | | 10/2008 | Kuryu | |

FOREIGN PATENT DOCUMENTS

| | | |
|---|---|---|
| JP | 61001438 | 1/1986 |
| JP | 62142044 | 6/1987 |
| JP | 10166233 | 6/1998 |
| JP | 2005069377 | 3/2005 |

* cited by examiner

*Primary Examiner* — Dirk Wright
(74) *Attorney, Agent, or Firm* — Diederiks & Whitelaw, PLC

(57) ABSTRACT

A lubrication system for transporting lubrication oil in an automatic transmission includes a radial lubrication passage opening at a hole in an outer peripheral surface of a shaft. The hole has a cross section that is elongated only along a first axis offset from a central axis the shaft so as to follow angular deformation caused by unidirectional torque applied to the shaft whereby stress produced around the hole by torque transmitted through the rotating shaft is reduced, thus minimizing fatigue and increasing a useful life of the automatic planetary transmission. Preferably cross sections of the radial passage taken sequentially along the transverse axis are elongated near outer peripheral surface of the shaft but become circular towards the central axis. With this arrangement stress produced around the hole by torque transmitted through the rotating shaft is reduced thus reducing fatigue and increasing a useful life of the transmission.

17 Claims, 4 Drawing Sheets

FATIGUE RESISTANT TRANSVERSE LUBRICATION PASSAGE FOR TRANSMISSION SHAFTS

FIELD OF THE INVENTION

The present invention pertains to the art of transmissions, particularly providing shafts with lubricating passages for distributing lubricating oil to various moving parts in an automatic transmission. Furthermore, the invention pertains to ensuring that the transmission shafts are still resistant to fatigue after the lubricating passages have been formed.

BACKGROUND OF INVENTION

Automatic vehicle transmissions function to transmit torque from an input shaft connected a power source, such as an internal combustion engine or an electric motor, to an output shaft connected to a set of driven wheels. Typically the transmission is provided with a gearing system that includes interlocking gears mounted on rotating shafts designed to vary a ratio of the speed of the input shaft to the speed of the output shaft. In order to increase the efficiency of the gearing system, the system needs to be lubricated.

In addressing this problem it is known to establish a lubrication system by forming lubrication passages in the shafts and gears of the gearing system to allow lubrication oil to be distributed throughout the transmission. The lubrication system also includes a sump at the bottom of the transmission that holds extra lubrication oil. A pump draws lubrication oil from the sump and sends the oil through the lubrication passages to lubricate the various moving parts of the transmission. In the case of a planetary gearshift transmission having multiple interlinked planetary gearsets mounted on several rotating shafts, central lubrication passages are often formed so as to extend axially within each shaft. Radially extending holes are provided at various spots in the rotating shafts to allow the lubrication to travel from the central lubrication passages outwardly through the radial passages to where the oil is needed.

While such designs have proven satisfactory in the past, the performance demands on transmissions have been increasing over time. That is transmissions are required to last longer and carry heavier loads. As a result, transmission designs need to be more resistant to wearing out due to fatigue while carrying heavier torques. In the case of a planetary transmission fatigue, failures can occur at the outer surfaces of the rotating shafts near the radial lubrication passages. Such fatigue failures are particularly problematic on rotating shafts that are subject to heavy loads. To address the problem of heavier loads it is possible to simply increase the shaft diameter of each affected shaft or alternatively use more durable materials. However, increasing a shaft diameter not only requires more material for that shaft, but many other parts of the transmission must be redesigned as many shafts are designed to rotate within each other in a nested, concentric configuration. Furthermore the cost of using more durable materials is significant. In either case the additional cost is unacceptable.

As can be seen by the above discussion, there is a need in the art for a system that will effectively distribute lubricating oil to the various moving parts in a vehicle transmission while allowing the transmission to carry heavy loads. More particularly there is a need for a system that will reduce fatigue failure while not requiring a change in shaft size even though the transmission is designed to transmit more torque over a longer lifespan.

SUMMARY OF THE INVENTION

The present invention is directed to an automatic transmission that includes a lubrication system. The transmission functions to transmit torque from a power source, such as an internal combustion engine or an electric motor, to a set of driving wheels through a plurality of interconnected, rotatable shafts and gears. Preferably the transmission is planetary transmission and the rotatable shafts include an input shaft, an intermediate shaft and a sun gear shaft. Each of the rotatable shafts has an outer peripheral surface and a central axis of rotation. The lubrication system includes passages that transport lubrication oil throughout the automatic transmission.

Each of the rotatable shafts is each formed with an axial lubrication passage that extends along a central axis of the shaft. Each shaft is also formed with a radial lubrication passage that extends along a transverse axis from the axial lubrication passage to the outer peripheral surface of the shaft. The radial lubrication passage opens at a hole in the outer peripheral surface. The hole has a non-circular cross section formed by a plane extending at right angles to the transverse axis. Preferably the cross section is elongated along a first axis that is offset from the central axis so as to follow angular deformation caused by torque applied to the shaft. Most preferably the first axis is offset from the central axis by 45 degrees. The cross section preferably is substantially oval in shape. In particular, in accordance with one preferred embodiment the cross section has semicircular end portions connected by linear side segments.

Any cross section taken along the entire length of the radial passage in the first preferred embodiment is preferably the same shape and size as any other cross section taken along the length of the radial passage. In other words the size and shape of the radial passage is the same along its length. However, in a second preferred embodiment of the invention, the radial lubrication passage varies in size and shape along the transverse axis. More specifically cross sections of the outer portion of the radial passage taken sequentially along the transverse axis are elongated near the outer peripheral surface of the shaft but become circular near the central axis thus forming a tapered surface along the outer portion of the radial passage while the remainder of the passage located near the central axis is formed with a cylindrical surface. It is particularly advantageous to incorporate the lubrication system in bidirectional rotating shafts that transmit relatively high levels of torque in one direction more than an opposing direction such that the high torque is only experienced unidirectionally. With this arrangement, stress produced around the hole by torque transmitted through the rotating shaft is minimized, thus reducing fatigue and increasing a useful life of the transmission.

Additional objects, features and advantages of the present invention will become more readily apparent from the following detailed description of preferred embodiments when taken in conjunction with the drawings wherein like reference numerals refer to corresponding parts in the several views.

DESCRIPTION OF PREFERRED EMBODIMENTS

Figure 1:
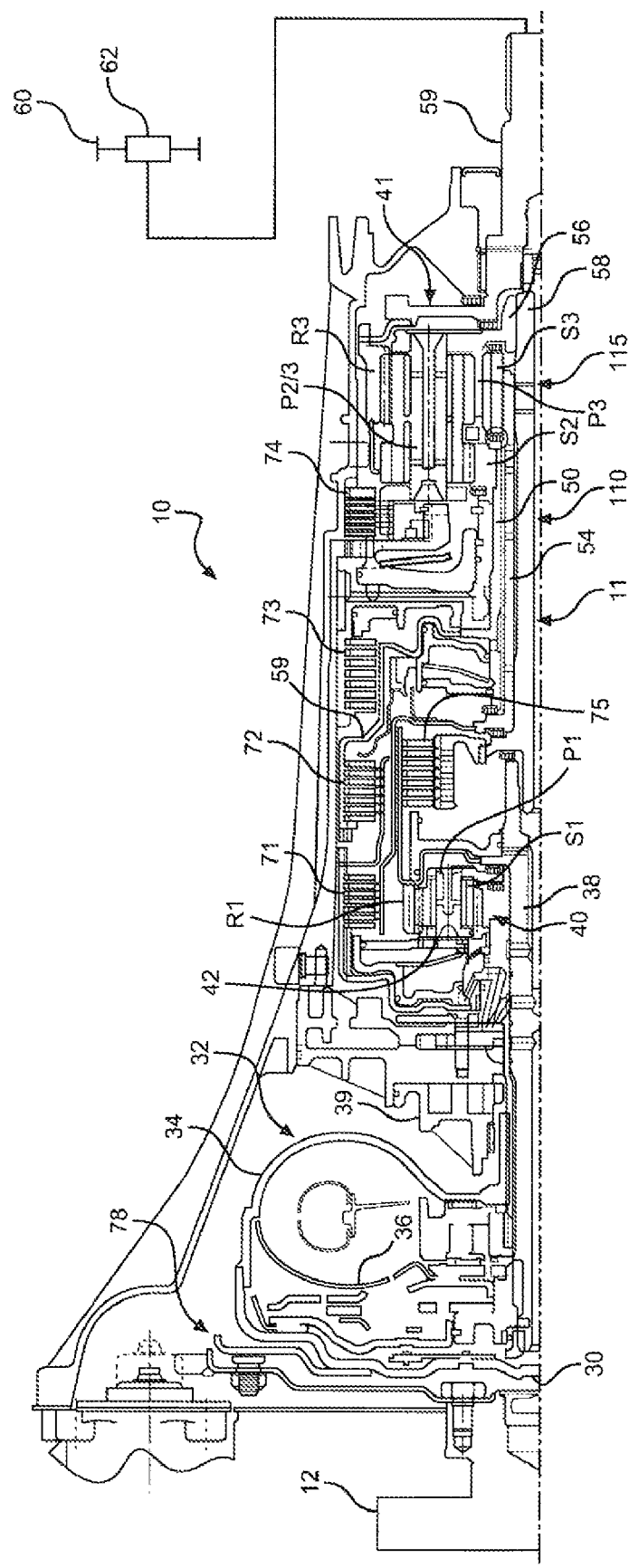
FIG. 1 a schematic diagram showing an automatic planetary transmission including an input shaft, an intermediate shaft and a sun gear shaft, along with a lubrication system in accordance with the invention.

With initial reference to FIG. 1, a planetary transmission 10 incorporating a lubrication system 11 is schematically illustrated. Torque from an engine 12 is distributed to torque input element 30 of hydrokinetic torque converter 32. An impeller 34 of torque converter 32 develops turbine torque on a turbine 36 in a known fashion. Turbine torque is distributed to a turbine shaft, which also constitutes a transmission input shaft 38. Impeller 34 is connected to a relatively small oil pump assembly 39.

In the exemplary embodiment shown, transmission 10 of FIG. 1 includes a simple planetary gearset 40, a compound planetary gearset 41 and numerous rotating shafts, which contain parts of lubrication system 11. Gearset 40 has a permanently fixed sun gear S1, a ring gear R1 and planetary pinions P1 rotatably supported on a carrier 42. Transmission input shaft 38 is drivably connected to ring gear R1. Compound planetary gearset 41, sometimes referred to as a Ravagineaux gearset, has a small pitch diameter sun gear S3, a torque output ring gear R3, a large pitch diameter sun gear S2 mounted on connecting shaft 50 and compound planetary pinions. The compound planetary pinions include long pinions P2/3, which drivably engage short planetary pinions P3 and torque output ring gear R3. Only one of short planetary pinions P3 is partially shown behind sun gear S3 and one of long planetary pinions P2/3. Long planetary pinions P2/3 also drivably engage short planetary pinions P3, while short planetary pinions P3 further engage sun gear S3 mounted on sun gear shaft 54. Planetary pinions P2/3 and P3 of gearset 41 are rotatably supported on compound carrier 56 which is supported on intermediate shaft 58. Ring gear R3 is drivably connected to a torque output shaft 59, which is drivably connected to vehicle traction wheels 60 through a differential and axle assembly 62. Gearset 40 is an underdrive ratio gearset arranged in series with respect to compound gearset 41.

During operation various forward and reverse gear ratios are established by operation of friction elements 71-75 in a known manner. Typically, transmission 10 preferably includes a lockup or torque converter bypass clutch, as shown at 78, to directly connect transmission input shaft 38 to engine 12 after a torque converter torque multiplication mode is completed and a hydrokinetic coupling mode begins.

Within planetary transmission 10, lubrication system 11 includes pump 39, a plurality of axially extending passages 110 and radially extending passages 115. Pump 39 draws lubrication oil from a sump (not shown) and directs the oil through the passages 110, 115 to various parts of transmission 10, such as gearset 40 and gearset 41, along with friction elements 71-75 in order to provide proper lubrication. While many parts of transmission 10 have lubrication passages 110, 115, several parts, such as input shaft 38, sun gear shaft 54 and intermediate shaft 58 carry relatively large amounts of unidirectional torque. For example, the torque applied to input shaft 38 is primarily applied in the same direction by engine 12, while the torque applied to output shaft 59 will switch direction when transmission 10 is placed in a reverse gear.

Figure 2A:
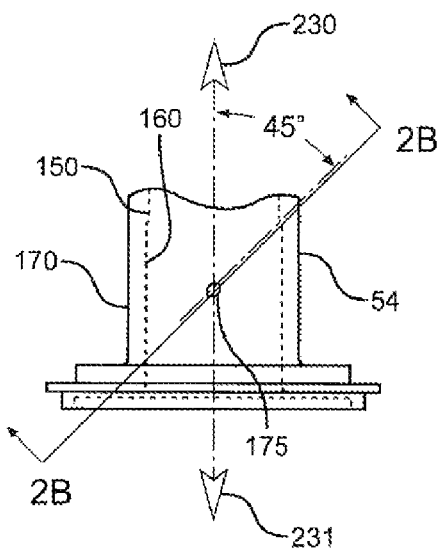
FIG. 2A is plan view of an elongated lubrication hole in the sun gear shaft of FIG. 1 angled to follow the direction of shaft deformation in accordance with a preferred embodiment of the invention.
Figure 2B:
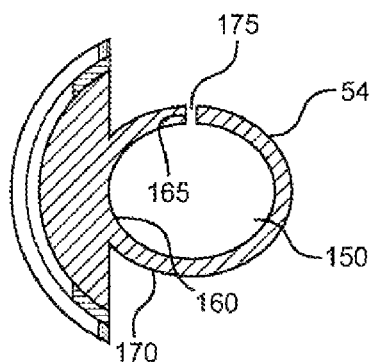
FIG. 2B is a cross-sectional view taken along the line 2B-2B of the sun shaft of FIG. 2A.
Figure 2C:
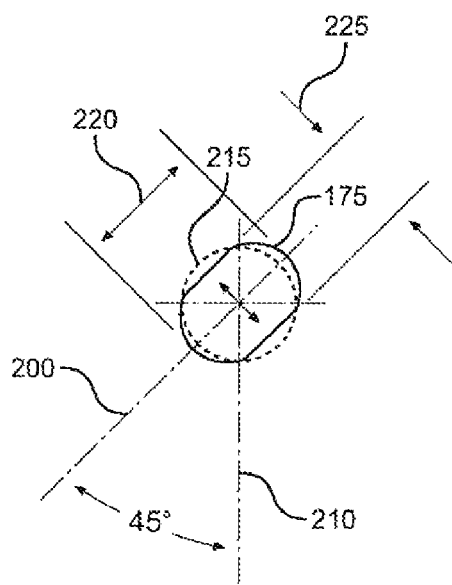
FIG. 2C shows the elongated hole of FIG. 2A superimposed on a circular hole.

With specific reference to FIGS. 2A-2C there is shown a detailed view of sun shaft 54. Sun shaft 54 has an axial lubrication passage 150 that has room to hold intermediate shaft 58 therein in a nested configuration has best seen in FIG. 1. In FIGS. 2A-2C intermediate shaft 58 has been removed for clarity but can be seen in FIGS. 3 and 4. Between an outer peripheral surface 155 of intermediate shaft 58 and an inner peripheral surface 160 of sun shaft 54 there is enough room for lubrication oil to travel axially within shaft 54 in axial lubrication passage 150. A radial lubrication passage 165 extends from axial lubrication passage 150 to an outer peripheral surface 170 of shaft 54 opening at a hole 175 in outer peripheral surface 170. A cross section of passage 165 at hole 175 is elongated only along a first axis 200, which is offset from a central axis 210. A hole 215, with a circular cross section, is shown superimposed on hole 175 to illustrate that passage 165 extends a longer distance 220 along axis 200 than a shorter distance 225 at a right angle to axis 200. Torque 230, 231 is shown being applied to each end of shaft 54 using the right hand rule convention. With this arrangement, passage 165 is elongated so as to follow angular deformation caused by torque 230, 231 transmitted through shaft 54 whereby stress in shaft 54 produced around hole 175 is reduced, thus reducing fatigue and increasing a useful life of transmission 10, as discussed more fully below.

Preferably, first axis 200 is offset 45 degrees from central axis 210 and the cross section of passage 165 and thus hole 175 has a substantially oval shape. As shown the cross section has semicircular end portions connected to linear side segments. The shape of elongated hole 175 is most beneficial when torque is predominately unidirectional. This is the case for input 38, intermediate 58 and sun shaft 54. The benefits of such an arrangement include being able to be manufactured in a relatively inexpensive manner because less material is used versus providing larger shafts, while transmission 10 also does not have to be redesigned to accommodate a larger shaft. For example increasing the diameter of shaft 58 will require a resizing of shafts 54 and 50. Furthermore since hole 175 is only elongated in one direction, less machining is required for its formation.

Figure 3:
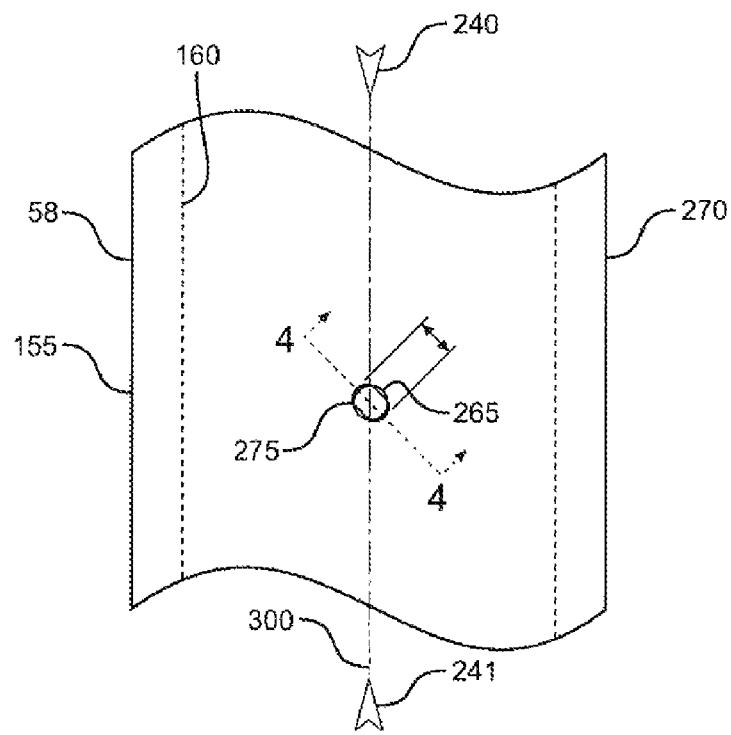
FIG. 3 is plan view of an elongated lubrication hole in the intermediate shaft of FIG. 1 angled to follow the direction of shaft deformation in accordance with another preferred embodiment of the invention.
Figure 4:
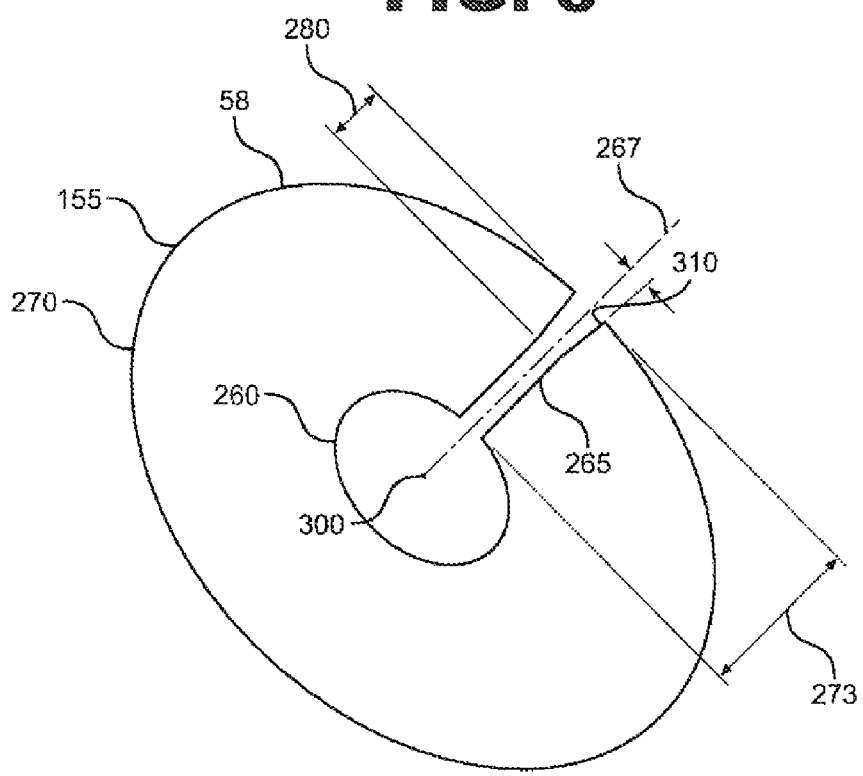
FIG. 4 is a cross-section view taken along the line 4-4 of the intermediate shaft of FIG. 3.

Turning now to FIGS. 3 and 4 there is depicted a detailed view of intermediate shaft 58 showing an applied torque 240, 241. FIG. 4 shows an axial lubrication passage 260 and a radial lubrication passage 265 that extends along a transverse axis 267 between axial lubrication passage 260 and an outer peripheral surface 270 a distance 273 opening at a hole 275. As in the case for sun shaft 54, radial lubrication passage 265 in intermediate shaft 58 also preferably has an elongated shape, but in this case the elongated shape is only present near outer peripheral surface 270 while the cross sectional shape of passage 265 near axial lubrication passage 260 is circular. Essentially the cross sections of an outer portion 280 of radial passage 265 taken sequentially along the transverse axis are elongated near outer peripheral surface 270 of shaft 58 but become circular near a central axis 300, thus forming a tapered surface 310 along radial passage 265. Tapered surface 310 requires less machining than forming an elongated hole with a non-tapered surface from axial passage 260 to outer peripheral surface 270.

Figure 5:
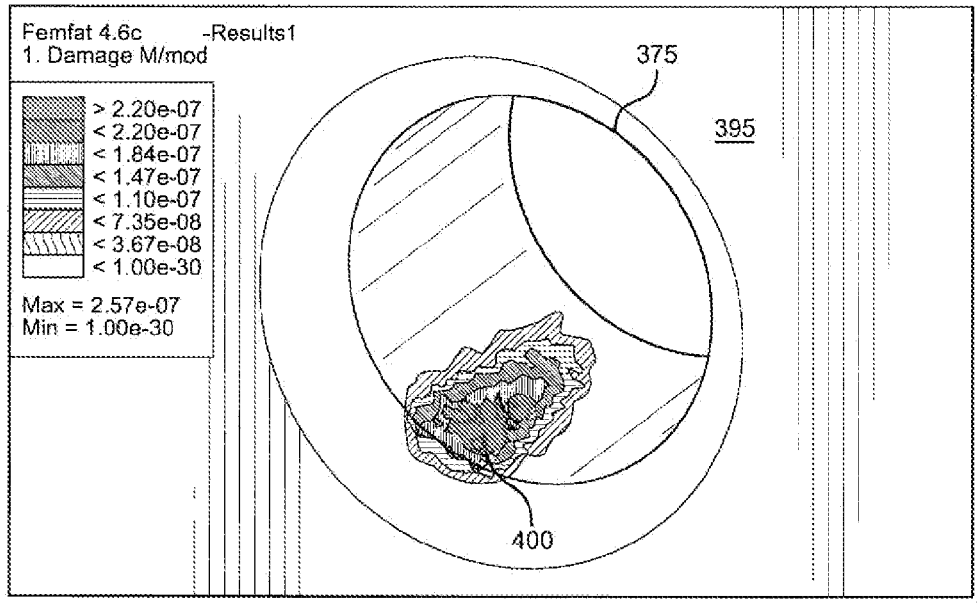
FIG. 5 is a perspective view of a prior art circular hole showing areas of fatigue damage after one torque pulse.
Figure 6:
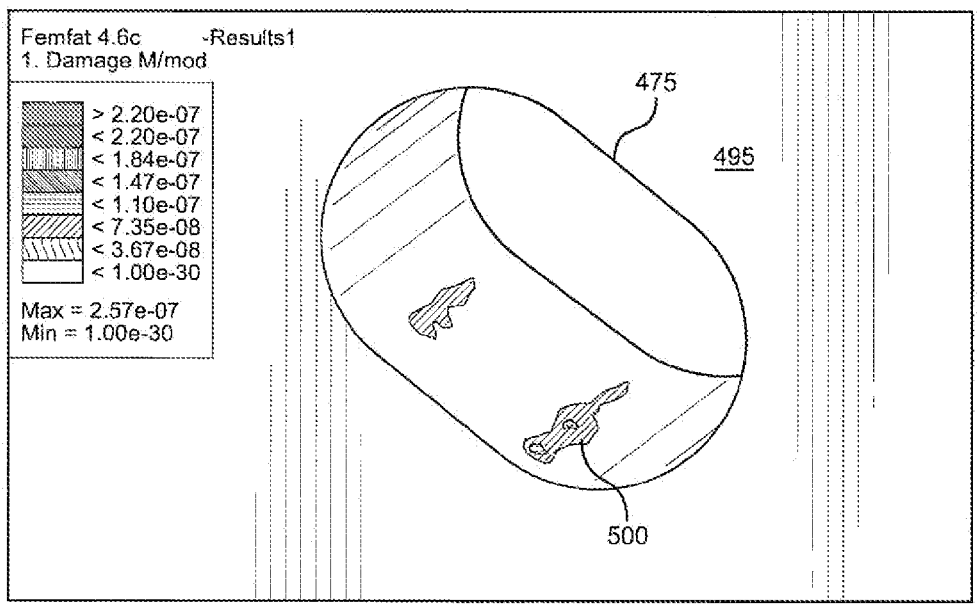
FIG. 6 is a perspective view of an elongated lubrication passage formed in accordance with the present invention showing areas of fatigue damage after one torque pulse.

FIG. 5 shows damage caused to a shaft having a hole 375 with a prior art circular shape. Hole 375 was formed in a test shaft 395 and subject to one torque pulse. Fatigue damage 400 caused by the pulse is shown in hole 375. By contrast FIG. 6 shows a shaft with an elongated hole 475 in accordance with the invention. Fatigue damage 500 is surprisingly low when test shaft 495 is subject to one torque pulse as compared to circular test hole 375 of FIG. 5.

Although described with reference to preferred embodiments of the invention, it should be readily understood that various changes and/or modifications can be made to the invention without departing from the spirit thereof. For instance, while the preferred embodiments refer to lubricating a transmission, it should be noted that the described passages could also be used to supply oil to clutch or brake actuating cylinders. Also, the elongation of a lubrication hole preferably is used to reduce stress in any shaft subject to unidirectional torque and the shape of the hole does not have to be substantially oval. Numerous different shapes may be used that are elongated only in a direction following angular deformation caused by unidirectional torque applied to the shaft. In general, the invention is only intended to be limited by the scope of the following claims.

The invention claimed is:

1. An automatic planetary transmission comprising:
    a rotatable shaft having an outer peripheral surface, said shaft extending along a central axis and being adapted to be drivingly connected to a power source; and
    a lubrication system for transporting lubrication oil in the automatic transmission, said lubrication system including:
        an axial lubrication passage extending within the rotatable shaft along the central axis; and
        a radial lubrication passage extending from the axial lubrication passage, along a transverse axis to the central axis, to the outer peripheral surface, with said radial lubrication passage opening at a hole in the outer peripheral surface, said hole having a cross section that is elongated only along a first axis offset from the central axis so as to follow angular deformation caused by unidirectional torque applied to the shaft whereby stress produced around the hole by torque transmitted through the rotating shaft is reduced, thus minimizing fatigue and increasing a useful life of the automatic planetary transmission.

2. The automatic planetary transmission of claim 1 wherein the first axis is offset 45 degrees from the central axis.

3. The automatic planetary transmission of claim 1 wherein the cross section has a substantially oval shape.

4. The automatic planetary transmission of claim 1 wherein the cross section has semicircular end portions connected by linear side segments.

5. The automatic planetary, transmission of claim 1 wherein cross sections of an outer portion of the radial passage taken sequentially along the transverse axis from the outer peripheral surface towards the central axis are non-circular.

6. The automatic planetary transmission of claim 5 wherein the cross sections of the outer portion of the radial passage taken sequentially along the transverse axis are elongated near the outer peripheral surface of the shaft but become more circular toward the central axis thus forming a tapered surface along outer portion of the radial passage.

7. The automatic planetary transmission of claim 1 wherein the rotating shaft is an input shaft.

8. The automatic planetary transmission of claim 1 wherein the rotating shaft is as sun gear shaft.

9. The automatic planetary transmission of claim 1 wherein the rotating shaft is an intermediate shaft.

10. A lubrication system for transporting lubrication oil for use in an automatic transmission with a rotatable shaft having an outer peripheral surface, said shaft extending along a central axis and being adapted to be drivingly connected to a power source, said system including:
    an axial lubrication passage extending within the rotatable shaft along the central axis; and
        a radial lubrication passage extending from the axial lubrication passage, along a transverse axis to the central axis, to the outer peripheral surface, with said radial lubrication passage opening at a hole in the outer peripheral surface, said hole having a cross section that is elongated only along a first axis offset from the central axis so as to follow angular deformation caused by unidirectional torque applied to the shaft whereby stress produced around the hole by torque transmitted through the rotating shaft is reduced, thus minimizing fatigue and increasing a useful life of the automatic planetary transmission.

11. The lubrication system of claim 10 wherein the first axis is offset 45 degrees from the central axis.

12. The lubrication system of claim 10 wherein the cross section has a substantially oval shape.

13. The lubrication system of claim 10 wherein the cross section has semicircular end portions connected by linear side segments.

14. The lubrication system of claim 10 wherein cross sections of an outer portion of the radial passage taken sequentially along the transverse axis from the outer peripheral surface towards the central axis are non-circular.

15. The lubrication system of claim 14 wherein the cross sections of the outer portion of the radial passage taken sequentially along the transverse axis are elongated near the outer peripheral surface of the shaft but become more circular toward the central axis thus forming a tapered surface along outer portion of the radial passage.

16. A method for reducing fatigue and increasing useful life in transmission shafts that have lubrication passages located therein comprising:
    forming a shaft that has an outer peripheral surface and extends along a central axis;
    applying a unidirectional torque to the shaft so that while the torque is being applied most of the torque is applied only one direction;
    forming an axial lubrication passage in the shaft along the central axis;
    forming a radial lubrication passage in the shaft;
    extending the radial lubrication passage from the axial lubrication passage to the outer peripheral surface to form a hole in the outer peripheral surface;
    reducing stress caused around the hole by elongating a cross section of the hole along a first axis offset from the central axis so as to follow angular deformation caused by torque applied to the shaft in the one direction.

17. The method of claim 16 further comprising:
    forming a tapered surface along the radial passage wherein the cross sections of the outer portion of the radial passage taken sequentially along the transverse axis are elongated near outer peripheral surface of the shaft but become circular near the central axis.

* * * * *